(12) United States Patent
Callahan et al.

(10) Patent No.: US 8,645,629 B2
(45) Date of Patent: Feb. 4, 2014

(54) PERSISTENT CACHEABLE HIGH VOLUME MANUFACTURING (HVM) INITIALIZATION CODE

(75) Inventors: Timothy J. Callahan, Portland, OR (US); Snigdha Jana, Portland, OR (US); Nandan A. Kulkarni, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 12/560,589

(22) Filed: Sep. 16, 2009

(65) Prior Publication Data

US 2011/0066810 A1 Mar. 17, 2011

(51) Int. Cl.
*G06F 12/00* (2006.01)
*G06F 15/177* (2006.01)

(52) U.S. Cl.
USPC ................. 711/128; 713/2; 711/E12.018

(58) Field of Classification Search
USPC ............................................... 711/128; 713/2
See application file for complete search history.

(56) References Cited

U.S. PATENT DOCUMENTS

| | | | | |
|---|---|---|---|---|
| 5,889,679 A | * | 3/1999 | Henry et al. | 716/119 |
| 6,473,853 B1 | * | 10/2002 | Spiegel et al. | 713/1 |
| 7,783,926 B2 | * | 8/2010 | Chu Chen | 714/36 |
| 2003/0126508 A1 | * | 7/2003 | Litt | 714/39 |
| 2006/0282621 A1 | * | 12/2006 | Moyer | 711/141 |
| 2007/0136530 A1 | * | 6/2007 | Tanaka | 711/128 |
| 2010/0250856 A1 | * | 9/2010 | Owen et al. | 711/128 |

* cited by examiner

*Primary Examiner* — Reginald Bragdon
*Assistant Examiner* — Aracelis Ruiz
(74) *Attorney, Agent, or Firm* — Schwegman, Lundberg & Woessner, P.A.

(57) ABSTRACT

A persistent cacheable high volume manufacturing (HVM) initialization code is generally presented. In this regard, an apparatus is introduced comprising a processing unit, a unified cache, a unified cache controller, and a control register to selectively mask off access by the unified cache controller to portions of the unified cache. Other embodiments are also described and claimed.

7 Claims, 3 Drawing Sheets

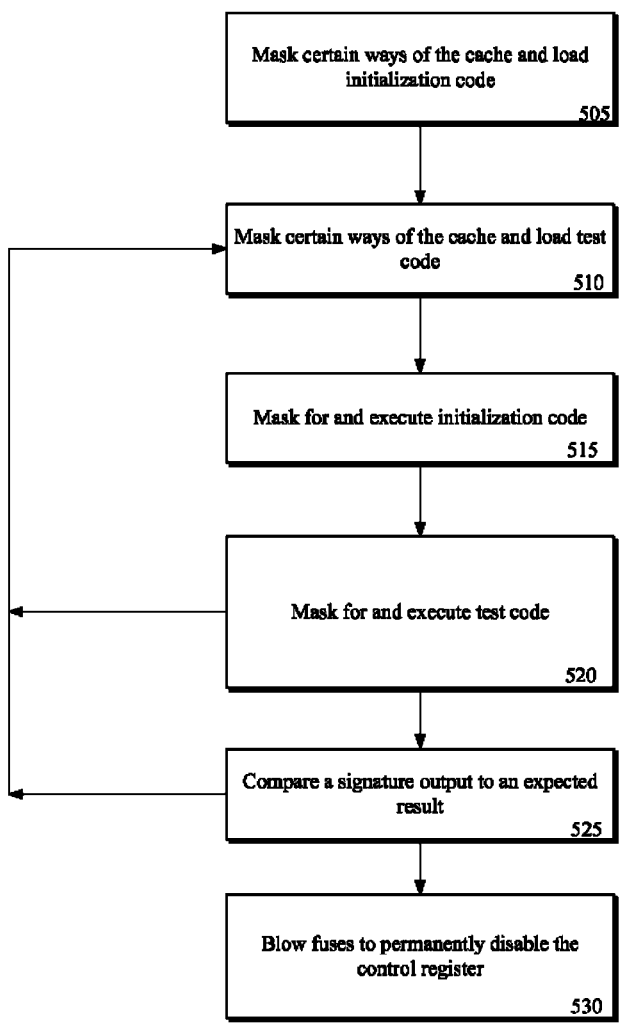

US 8,645,629 B2

PERSISTENT CACHEABLE HIGH VOLUME MANUFACTURING (HVM) INITIALIZATION CODE

FIELD

Embodiments of the present invention may relate to the field of microprocessor design and testing, and more specifically to a persistent cacheable high volume manufacturing initialization code.

BACKGROUND

High volume manufacturing (HVM) test costs are highly dependent on the amount of time necessary to run a multitude (typically thousands) of tests to validate all aspects of the microprocessor. Between tests it is necessary to re-initialize the microprocessor to a known state so that subsequent tests may yield an expected result provided that the microprocessor is functioning properly. As the number of required tests increases, the amount of time needed to load and run initialization code becomes non-trivial.

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein:

FIG. 5 is a flowchart of an example method of implementing persistent cacheable HVM initialization code, in accordance with one example embodiment of the invention.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
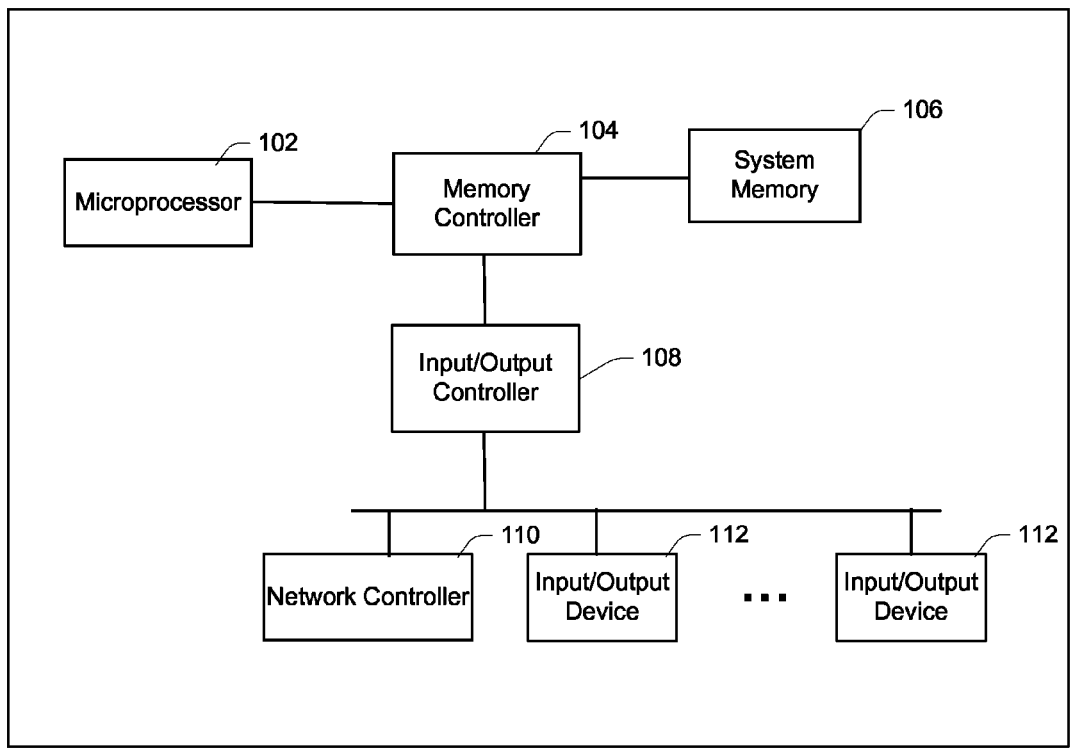
FIG. 1 is a block diagram of an example electronic appliance suitable for implementing persistent cacheable HVM initialization code, in accordance with one example embodiment of the invention.

FIG. 1 is a block diagram of an example electronic appliance suitable for implementing persistent cacheable HVM initialization code, in accordance with one example embodiment of the invention. Electronic appliance 100 is intended to represent any of a wide variety of traditional and non-traditional electronic appliances, laptops, cell phones, wireless communication subscriber units, personal digital assistants, or any electric appliance that would benefit from the teachings of the present invention. In accordance with the illustrated example embodiment, electronic appliance 100 may include one or more of microprocessor 102, memory controller 104, system memory 106, input/output controller 108, network controller 110, and input/output device(s) 112 coupled as shown in FIG. 1.

Microprocessor 102 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, microprocessor 102 is an Intel® compatible processor. Microprocessor 102 may have an instruction set containing a plurality of machine level instructions that may be invoked, for example by an application or operating system. Microprocessor 102 may include elements as described in greater detail in regards to FIG. 2.

Memory controller 104 may represent any type of chipset or control logic that interfaces system memory 106 with the other components of electronic appliance 100. In one embodiment, a link which communicatively couples microprocessor 102 and memory controller 104, may be a high speed/frequency serial link such as Intel® QuickPath Interconnect. In another embodiment, memory controller 104 may be incorporated along with microprocessor 102 into an integrated package.

System memory 106 may represent any type of memory device(s) used to store data and instructions that may have been or will be used by microprocessor 102. Typically, though the invention is not limited in this respect, system memory 106 will consist of dynamic random access memory (DRAM). In one embodiment, system memory 106 may consist of Rambus DRAM (RDRAM). In another embodiment, system memory 106 may consist of double data rate synchronous DRAM (DDRSDRAM).

Input/output (I/O) controller 108 may represent any type of chipset or control logic that interfaces I/O device(s) 112 with the other components of electronic appliance 100. In one embodiment, I/O controller 108 may be referred to as a south bridge. In another embodiment, I/O controller 108 may comply with the Peripheral Component Interconnect (PCI) Express™ Base Specification, Revision 1.0a, PCI Special Interest Group, released Apr. 15, 2003 and/or other revisions.

Network controller 110 may represent any type of device that allows electronic appliance 100 to communicate with other electronic appliances or devices. In one embodiment, network controller 110 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 110 may be an Ethernet network interface card.

Input/output (I/O) device(s) 112 may represent any type of device, peripheral or component that provides input to or processes output from electronic appliance 100.

Figure 2:
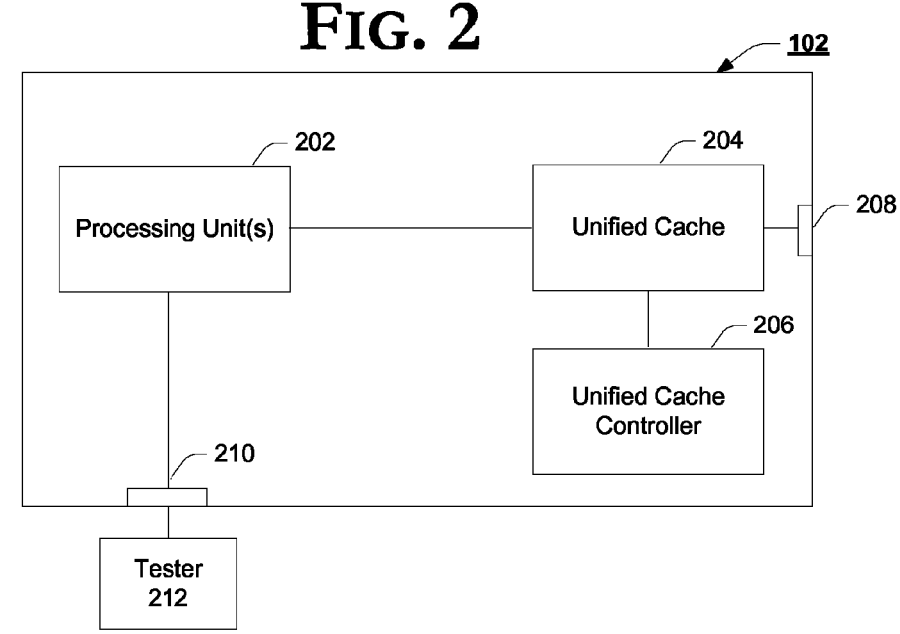
FIG. 2 is a block diagram of an example microprocessor suitable for implementing persistent cacheable HVM initialization code, in accordance with one example embodiment of the invention.

FIG. 2 is a block diagram of an example microprocessor suitable for implementing persistent cacheable HVM initialization code, in accordance with one example embodiment of the invention. Microprocessor 102 may include processing unit(s) 202, unified cache 204, unified cache controller 206, system interface 208, and signature output 210 as shown. Microprocessor 102 may also incorporate components or functions not shown, for example, memory controller 104.

Processing unit(s) 202 represent the logical and functional elements of microprocessor 102. In some examples, processing units(s) 202 may include processor cores, floating point units, controllers, registers, pointers, etc.

Unified cache 204 represents a level of cache accessible by processing unit(s) 202. In one embodiment, unified cache 204 represents a level two cache. Unified cache 204 may include elements as described in greater detail in regards to FIG. 3. Unified cache controller 206 controls the contents of unified cache 204, for example by writing entries and maintaining status of entries into unified cache 204. Unified cache controller 206 may implement a replacement policy, for example least recently used, when determining where to store an entry. In some embodiments, the functionality of unified cache controller 206 may be incorporated into another element, for example processing unit(s) 202.

System interface 208 provides a communication connection between microprocessor 102 and other components, for example components of electronic appliance 100 or a test fixture (not shown).

Signature output 210 may provide a status or result from processing unit(s) 202 after tests have been executed. In one embodiment, tester 212 may be coupled with signature output 210 (and/or system interface 208) to functionally test microprocessor 202 by comparing the output to an expected result as part of a HVM testing process, for example as described in regards to FIG. 5.

Figure 3:
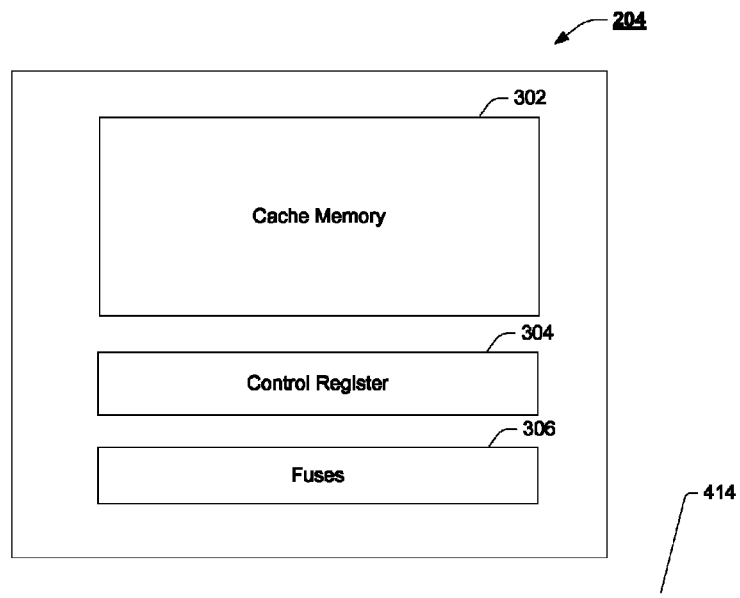
FIG. 3 is a block diagram of an example unified cache which implements persistent cacheable HVM initialization code, in accordance with one example embodiment of the invention.

FIG. 3 is a block diagram of an example unified cache which implements persistent cacheable HVM initialization code, in accordance with one example embodiment of the invention. Unified cache 204 may include cache memory 302, control register 304 and fuses 306. Cache memory 302 may represent a high speed static random access memory (SRAM) of any size and configuration. Control register 304 provides a means to selectively mask off access by unified cache controller 206 to portions of cache memory 302. In one embodiment, control register 304 indicates which portions of cache memory 302 are present and available for reading and writing. Unified cache controller 206 may respond to control register 304 in determining which portions of cache memory 302 are available for replacement. While shown as being part of unified cache 204, control register 304 may instead be incorporated elsewhere, for example in unified cache controller 206 or processing unit(s) 202. Fuses 306 are coupled with control register 304 and provide the ability to selectively permanently disable control register 304, for example after completion of HVM testing.

Figure 4:
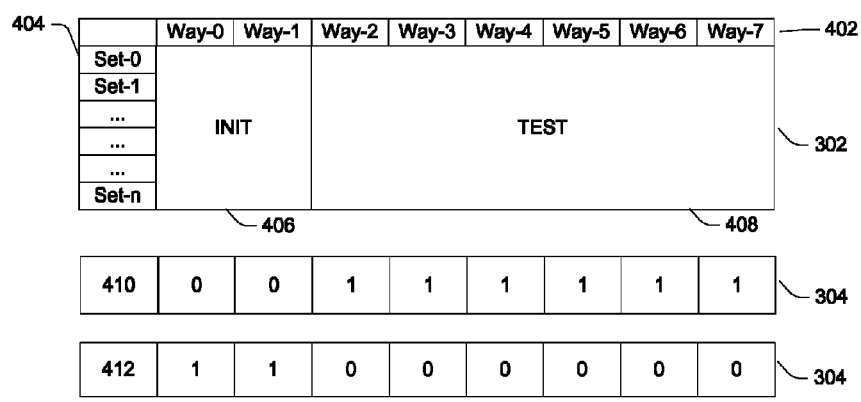
FIG. 4 is a block diagram of an example implementation of persistent cacheable HVM initialization code, in accordance with one example embodiment of the invention.

FIG. 4 is a block diagram of an example implementation of persistent cacheable HVM initialization code, in accordance with one example embodiment of the invention. Implementation 400 shows cache memory 302 along with two example settings for control register 304. In this example, though the present invention is not so limited, cache memory 302 is an associative cache including n sets 404 and 8 ways 402. Also in this example, control register 304 includes 8 bits each corresponding to a way of cache memory 302, though control register 304 may be designed to partition cache memory 302 differently. Setting 410 is intended to represent a value of control register 304 which enables access to ways 0 and 1, while masking off access to ways 2-7. Setting 410 may be utilized as part of a HVM test suite to load and run initialization code 406 into cache memory 302. Initialization code 406 may initialize processing unit(s) 202 to prepare them for testing. For example, initialization code 406 may clear registers, reset pointers, and otherwise return processing unit(s) 202 to a known state. Setting 412 is intended to represent a value of control register 304 which enables access to ways 2-7, while masking off access to ways 0 and 1. Setting 412 may be utilized as part of a HVM test suite to load and run test code 408, while allowing initialization code 406 to remain persistent, in cache memory 302. Test code 408 may test portions of processing unit(s) 202.

FIG. 5 is a flowchart of an example method of implementing persistent cacheable HVM initialization code, in accordance with one example embodiment of the invention. Method 500, which may be implementing as part of a HVM test suite, begins with masking (505) certain ways 402 of cache memory 302 to load initialization code 406. Control register 304 may be set to setting 410 which may indicate to unified cache controller 206 that only ways 0 and 1 are available. Next, the test suite may mask (510) certain ways 402 of cache memory 302 to load test code 408. Control register 304 may be set to setting 412 which may indicate to unified cache controller 206 that only ways 2-7 are available.

The method continues with masking for (515) and executing initialization code 406 to initialize processing unit(s) 202 and then masking for (520) and executing test code 408 to test processing unit(s) 202. Depending on whether more occurrences of test code 408 need to be run the method may return to 510 or may continue with comparing (525) signature output 210 to an expected result to determine if the device under test has passed. If more testing is needed the method may return to 510 or may finish with blowing (530) fuses 306 to permanently disable control register 304, if so desired.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method comprising:
    setting a control register to enable access to only a subset of ways of an n-way set associative unified cache within a microprocessor;
    loading an initialization code into the enabled ways of the unified cache;
    running the initialization code to initialize the microprocessor;
    setting the controller register to enable access to a remainder of ways of the unified cache;
    loading a test code into the enabled ways of the unified cache; and
    running the test code to test the microprocessor.

2. The method of claim 1, wherein setting a control register to enable access to only a subset of ways of an n-way set associative unified cache within a microprocessor comprises setting the control register to enable access to 2 ways of an 8 way set associative unified cache.

3. The method of claim 1, further comprising:
setting the control register to enable access to the ways containing the previously loaded initialization code; and
running the initialization code again.

4. The method of claim 3, further comprising:
setting the control register to enable access to the remainder of the unified cache;
loading a second test code into the enabled ways of the unified cache; and
running the second test code.

5. The method of claim 4, further comprising iteratively accessing and running the stored initialization code between the loading and running of test codes until all test codes have been run.

6. The method of claim 5, comparing a signature output to an expected result to validate the functionality of the microprocessor.

7. The method of claim 6, further comprising blowing fuses to permanently disable the control register.

\* \* \* \* \*